United States Patent
Whitelock et al.

(10) Patent No.: US 8,209,165 B2
(45) Date of Patent: Jun. 26, 2012

(54) METHOD FOR MATCHING OF BILINGUAL TEXTS AND INCREASING ACCURACY IN TRANSLATION SYSTEMS

(75) Inventors: Peter John Whitelock, Oxfordshire (GB); Victor Poznanski, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 959 days.

(21) Appl. No.: 11/944,334

(22) Filed: Nov. 21, 2007

(65) Prior Publication Data

US 2008/0126074 A1    May 29, 2008

(30) Foreign Application Priority Data

Nov. 23, 2006    (GB) .................... 0623360.5

(51) Int. Cl.
*G06F 17/28* (2006.01)
*G06F 17/21* (2006.01)
(52) U.S. Cl. .................... 704/2; 704/4; 704/10
(58) Field of Classification Search .......... 704/1–10
See application file for complete search history.

(56) References Cited

U.S. PATENT DOCUMENTS

| | | | | |
|---|---|---|---|---|
| 5,659,765 A * | 8/1997 | Nii .................... | 704/4 |
| 5,724,593 A * | 3/1998 | Hargrave et al. .............. | 704/7 |
| 5,907,821 A * | 5/1999 | Kaji et al. .................... | 704/4 |
| 5,978,798 A | 11/1999 | Poznanski et al. | |
| 6,151,570 A * | 11/2000 | Fuji .................... | 704/3 |
| 6,330,530 B1 * | 12/2001 | Horiguchi et al. ............. | 704/4 |
| 6,523,000 B1 | 2/2003 | Ando et al. | |
| 6,535,842 B1 * | 3/2003 | Roche et al. .................. | 704/7 |
| 6,598,015 B1 * | 7/2003 | Peterson et al. ............... | 704/3 |
| 6,928,448 B1 * | 8/2005 | Franz et al. .................... | 1/1 |
| 7,107,204 B1 * | 9/2006 | Liu et al. .................... | 704/2 |
| 2002/0111789 A1 * | 8/2002 | Hull .................... | 704/4 |
| 2002/0138250 A1 * | 9/2002 | Okura et al. .................... | 704/2 |
| 2004/0002848 A1 * | 1/2004 | Zhou et al. .................... | 704/2 |
| 2006/0004560 A1 | 1/2006 | Whitelock | |

FOREIGN PATENT DOCUMENTS

| | | |
|---|---|---|
| GB | 2 279 164 A | 12/1994 |
| GB | 2 415 518 A | 12/2005 |

OTHER PUBLICATIONS

Somers, "Review Article: Example-based Machine Translation", Machine Translation 14: 113-157, Kluwer Academic Publishers, 1999.*

Furuse et al. "Transfer-Driven Machine Translation", [International Workshop on Fundamental Research for the Future Generation of Natural Language Processing (FGNLP), Jul. 1992.*

(Continued)

*Primary Examiner* — Jialong He
(74) *Attorney, Agent, or Firm* — Birch, Stewart, Kolasch & Birch, LLP

(57) ABSTRACT

A method is disclosed for translation of an input sentence in a source language to an output sentence in a target language using a store comprising a plurality of example sentences in the source language each paired with its translation in the target language. The method provides for improved matching of the input text against the store of example sentences by analysing both the sentences in the store and the input sentence using a bilingual resource combining aspects of a bilingual dictionary and thesaurus in order to determine the senses and translations of the words in the input sentence and the examples.

24 Claims, 4 Drawing Sheets

OTHER PUBLICATIONS

Brown, P.F., et al. *A statistical Approach to Machine Translation*, Computational Linguistics vol. 16, Issue 2 (Jun. 1990) MIT Press, Cambridge, MA 1990.

Brown, R.D., *Example-Based Machine Translation in the Pangloss System*, Proceedings of the 16th Coling, Copenhagen, pp. 169-174, 1996.

Chiang, D., *A Hierarchial Phrase-Based Model for Statistical Machine Translation*, Proceedings of the 43rd Annual Meeting of the ACL, 2005.

Eck, M. and C. Hori, *Overview of the IWSLT 2005 Evaluation Campaign*, Carnegie-Mellon University, Pittsburgh, 2005.

Lepage, Y. and Denoual E. *The Purest EBMT System Ever Built: No variables, no templates, no training, examples, just examples, only examples*, Proceedings of the 2nd Workshop on Example-Based Machine Tranlsation, Phuket, pp. 81-90, 2005.

Nagao, M., *A Framework of a Mechanical Translation between Japanese and English by Analogy Principle*, A. Elithorn and R. Banerji (eds.) *Artifical and Human Intelligence*, Amsterdam, North Holland, 1980.

Nirenburg, S., et al. *Two Approaches to Matching in Example-Based Machine Translation*, 5th TMI, Kyoto, pp. 47-57, 1993.

Poznaski, V.,et al., *Practical Glossing by Prioritised Tiling*, Proceedings of the 17th COLING, Montreal, pp. 1060-1066, 1998.

Rijsbergen, C.J., *Information Retreival*, London, Butterworths, Preface and pp. 1-147, 1979.

Sumita, E., *Example-Based Machine Translation Using DP-Matchinq Between Word Sequences*, found in *Recent Advances in Example-Based Macine Translation*, Carl, M. and Way, A. (eds.), Kluwer Academic Publishers, Dordrecht, 2003.

\* cited by examiner

FIG. 3

```
EBMT(input_text, bilingual_repository, bilingual_resource)
{
        annotated_bilingual_repository := annotate(bilingual_repository, bilingual_resource)

annotated_input_text := annotate_best(input_text, bilingual_resource)

best_example := null
        best_score := 0
        FOREACH example ex IN annotated_bilingual_repository
                score := compare(annotated_input_text, ex);
                IF (score > best_score) THEN
                        best_example := ex;
                        best_score := score;
                END IF unmatched_input_parts :=
                unmatched_source_parts(best_example, annotated_input_text)
        example_target_parts := aligned_example_target_parts(best_example);
        translated_source_parts := inner_translate(unmatched_input_parts,
                                        example_target_parts,
                                        ex, bilingual_resource);
        output_text := substitute(ex, example_target_parts, translated_source_parts);
        result := improve(output_text);
        RETURN result;
}
```

METHOD FOR MATCHING OF BILINGUAL TEXTS AND INCREASING ACCURACY IN TRANSLATION SYSTEMS

FIELD OF THE INVENTION

The present invention relates to the field of Machine Translation and constitutes a method for improved matching of bilingual texts and increasing accuracy in translation systems.

BACKGROUND OF THE INVENTION

Many techniques for the automatic translation of one natural language into another (Machine Translation, MT) are based on the use of a repository of existing bilingual texts, that is texts and their translations by humans into one or more other languages. They either learn or induce translation rules from them automatically, as in approaches such as Statistical MT (SMT), or treat them as apposite examples, fragments from which can be assembled into new translations (Example Based MT or EBMT).

One approach to EBMT assembles a translation by first finding the single best-matching bilingual example, as in [US Patent Application 20060004560, Method and apparatus for translation based on a repository of existing translations] and [Sumita, 2003, in Recent Advances in Example-Based Machine Translation, M. Carl and A. Way (eds.), Kluwer Academic]. The input sentence is approximately matched against the example. The result of this matching is an alignment between input and example which includes sub-alignments between stretches which are identical (matched stretches) and sub-alignments between stretches which are not identical (unmatched stretches). The translations of the unmatched stretches in the target side of the example may then be replaced by the translations of the unmatched stretches in the input. The example acts as a template which is known to be well-formed, disambiguated and which can be used as a substantial basis for the construction of the remainder of the translation. However, the success of this technique depends on being able to find in the repository of existing translations the example whose source side is most similar to the input. The prior art assumes that similarity can be adequately defined in terms of the source language alone. However there are many instances where similar expressions in the source language translate very differently into another language.

The open literature contains many examples of EBMT systems which exploit thesaurus information in order to determine the similarity of input sentences and stored examples. [Sumita, 2003, op. cit.] shows that a monolingual thesaurus can be inadequate when matching input to examples, even when the source sides are both syntactically and semantically close. This is because their translation can be substantially different in the target language. His solution is to refine the thesaurus or add examples. However, his thesaurus is still essentially monolingual and is refined according to the particular examples in the database, rather than on the basis of the target language word similarity.

Having found the best match, Sumita's method relies on having a bilingual dictionary of unambiguous single word translations to substitute for the unmatched parts. It cannot disambiguate the dictionary entries, nor does it allow entries that contain several words or collocations.

It is desirable to improve matching of an input text against a repository of existing translations by detecting those elements in input text and source side of stored translation which, while superficially similar, have different translations.

It is also desirable to use the translations of the unmatched stretches in the target side of the example to assist in the determination of the scope and sense of translations of the unmatched stretches in the input.

SUMMARY OF THE INVENTION

According to a first aspect of the present invention there is provided a method of machine translating an input text in a source language to an output text in a target language using a repository comprising a plurality of bilingual texts each comprising a text in the source language paired with its translation in the target language, the method comprising: (a) analysing the repository of bilingual texts using a bilingual resource to associate information from the bilingual resource with the respective source language sides of at least some of the bilingual texts in the repository, or at least using a repository of bilingual texts that has been pre-analysed in such a way; (b) analysing the input text using a bilingual resource to associate information from the bilingual resource with the input text; (c) selecting a bilingual text from the repository to be used as a basis for determining the translation of the input text; (d) identifying parts of the source side of the bilingual text selected in step (c) that differ from corresponding respective parts of the input text using the information associated with the input text and the information associated with the source side of the bilingual text selected in step (c), those parts being designated unmatched parts; (e) identifying those parts of the target side of the bilingual text selected in step (c) that are respective translations of the unmatched parts of the source side of that bilingual text; (i) determining respective translations of the unmatched parts of the input text; (g) substituting the parts of the target side of the bilingual text identified in step (e) with the translations determined in step (f); and (h) using the result of step (g) as the translation of the input text, or at least as a basis therefor.

According to a second aspect of the present invention there is provided a method of selecting a bilingual text for use as a basis for machine translating an input text in a source language to an output text in a target language using a repository comprising a plurality of bilingual texts each comprising a text in the source language paired with its translation in the target language, the method comprising: (a) analysing the repository of bilingual texts using a bilingual resource to associate information from the bilingual resource with the respective source language sides of at least some of the bilingual texts in the repository, or at least using a repository of bilingual texts that has been pre-analysed in such a way; (b) analysing the input text using a bilingual resource to associate information from the bilingual resource with the input text; (c) selecting, in dependence upon the information associated with the input text and the information associated with the source sides of the respective bilingual texts, a bilingual text from the repository to be used as a basis for determining the translation of the input text.

According to a third aspect of the present invention there is provided an apparatus for translating an input text in a source language to an output text in a target language using a repository comprising a plurality of bilingual texts each comprising a text in the source language paired with its translation in the target language, the apparatus comprising: (a) means for analysing the repository of bilingual texts using a bilingual resource to associate information from the bilingual resource with the respective source language sides of at least some of the bilingual texts in the repository, or at least using a repository of bilingual texts that has been pre-analysed in such a way; (b) means for analysing the input text using a bilingual resource to associate information from the bilingual resource with the input text; (c) means for selecting a bilingual text from the repository to be used as a basis for determining the translation of the input text; (d) means for identifying parts of the source side of the bilingual text selected by means (c) that differ from corresponding respective parts of the input text using the information associated with the input text and the information associated with the source side of the bilingual text selected by means (c), those parts being designated unmatched parts; (e) means for identifying those parts of the target side of the bilingual text selected by means (c) that are respective translations of the unmatched parts of the source side of that bilingual text; (f) means for determining respective translations of the unmatched parts of the input text; (g) means for substituting the parts of the target side of the bilingual text identified by means (e) with the translations determined by means (f); and (h) means for using the result of means (g) as the translation of the input text, or at least as a basis therefor.

According to a fourth aspect of the present invention there is provided an apparatus for selecting a bilingual text for use as a basis for machine translating an input text in a source language to an output text in a target language using a repository comprising a plurality of bilingual texts each comprising a text in the source language paired with its translation in the target language, the apparatus comprising: (a) means for analysing the repository of bilingual texts using a bilingual resource to associate information from the bilingual resource with the respective source language sides of at least some of the bilingual texts in the repository, or at least using a repository of bilingual texts that has been pre-analysed in such a way; (b) means for analysing the input text using a bilingual resource to associate information from the bilingual resource with the input text; (c) means for selecting, in dependence upon the information associated with the input text and the information associated with the source sides of the respective bilingual texts, a bilingual text from the repository to be used as a basis for determining the translation of the input text.

Preferred embodiments of the present invention are set out in the appended dependent claims.

According to a fifth aspect of the present invention there is provided a program for controlling an apparatus to perform a method according to the first or second aspect of the present invention or which, when loaded into an apparatus, causes the apparatus to become an apparatus according to the third or fourth aspect of the present invention. The program may be carried on a carrier medium. The carrier medium may be a storage medium. The carrier medium may be a transmission medium.

According to a sixth aspect of the present invention there is provided an apparatus programmed by a program according to the fifth aspect of the present invention.

According to a seventh aspect of the present invention there is provided a storage medium containing a program according to the fifth aspect of the present invention.

An embodiment of the present invention makes it possible to determine more accurately the similarity between an input and the source side of a stored translation, and at the same time to determine more accurately the scope of matched and unmatched stretches which will improve the accuracy of the translation.

Furthermore an embodiment of the present invention makes it possible to determine information regarding the sense of an expression in the input which does not appear in the source side of the matching stored example and thus improve the translation of that expression.

BRIEF DESCRIPTION OF THE DRAWINGS

FIG. 3 shows an algorithm for use in an embodiment of the present invention.

DETAILED DESCRIPTION OF THE INVENTION

Figure 1:
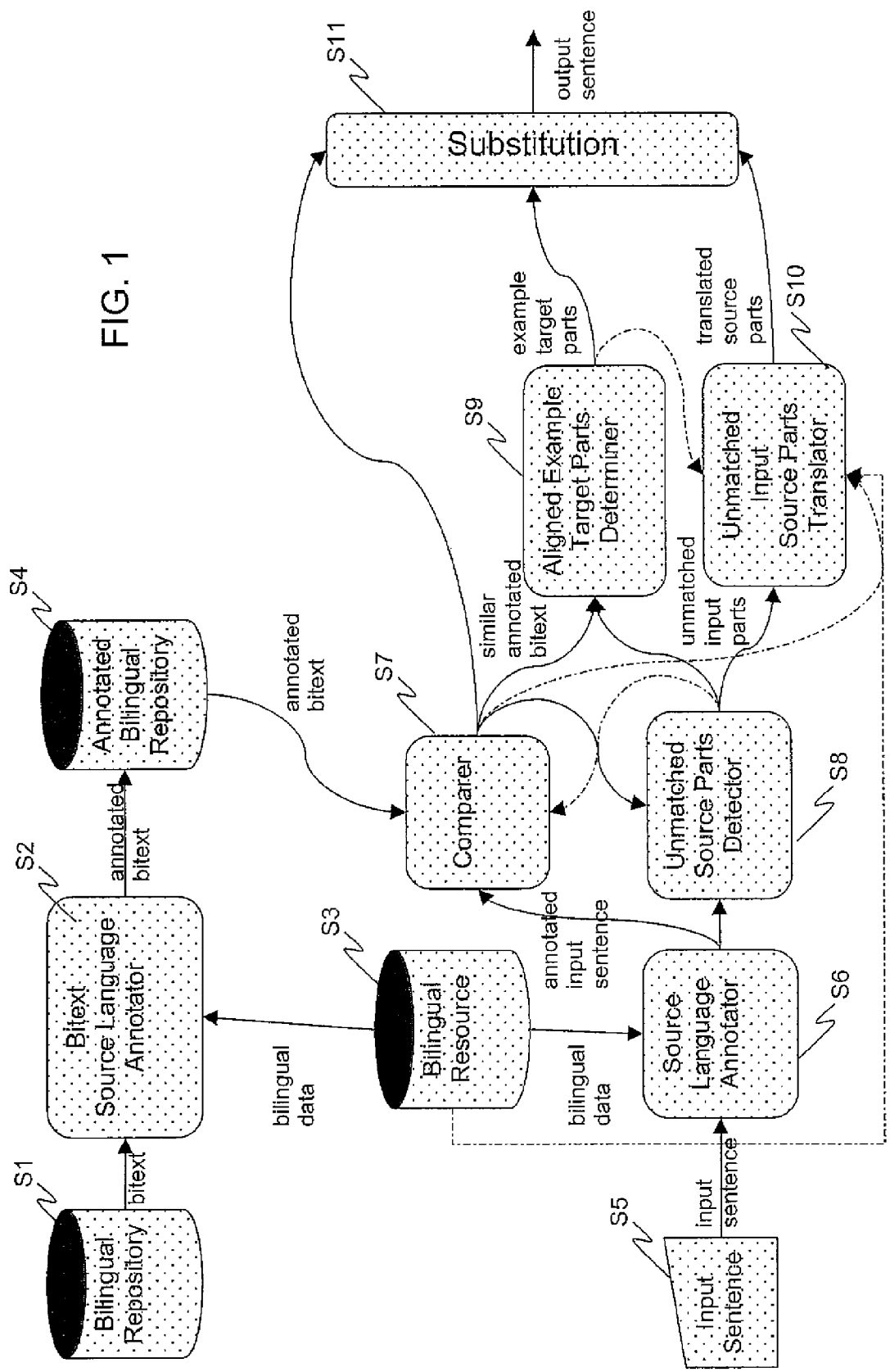
FIG. 1 is a schematic diagram illustrating the module structure of a translation apparatus embodying the present invention.

An apparatus embodying the present invention for translating an input sentence in a source language to an output sentence in a target language will now be described with reference to FIG. 1.

A collection of bilingual texts (S1) undergoes processing by a bitext annotator (S2) with reference to a bilingual resource (S3), the latter combining the information characteristically found in dictionaries and thesauruses. The information includes a number of dictionary entries each of which specifies the translation relation between one or more words in each of the two languages. The thesaurus information is a code. The codes are such that any pair of codes can be compared to provide a numerical measure of the similarity of said codes. At least some of the words in the dictionary entries are associated with one or more thesaurus codes. The same code may be associated with one word on one side and one word on the other side. The interpretation of such a dictionary entry is that the code represents a sense of the word in each language and that when a use of word has that sense in one of the languages then the translation given by the entry is appropriate; conversely, if an instance of word is translated in that way in a particular context, then it has that sense.

The collection of bilingual texts is assumed partitioned into a number of fragments, each comprising one or a small number of sentences in each of the two languages. For simplicity we will describe the operation of the system for fragments consisting of a single sentence in each language. During processing by the bitext annotator (S2) of a bilingual example comprising a source sentence and a target sentence, dictionary entries are located in the bilingual resource (S3) such that all the words on the source side of the entry are found in the source sentence and all the words on the target side of the entry are found in the target sentence. The thesaurus codes associated with this dictionary entry are then used to label one or more of the source language words. The relation of a word or words in the source language sentence and their equivalent word or words in the target language sentence within a bilingual sentence pair is called an alignment. The result of processing is an annotated bilingual repository (S4), within each bilingual sentence of which the words are labeled with thesaurus codes and aligned or labeled with their translations. The alignment between words and their translations includes the information about the positions of the words in the two strings.

When an input sentence to be translated enters the system by means of an input device (S5) it is subject to processing by the source language annotator (S6). In this case it is not always possible to determine the sense of the words in the input. However, a single dictionary entry which matches a number of items in the input is assumed to be more likely to be correct than a dictionary entry which matches fewer items. A subset of the dictionary entries which match the input can thus be chosen by a priority scheme such as that disclosed by [U.S. Pat. No. 5,978,798, Apparatus for and Method of Accessing a Database]. It is not necessary however to choose between multiple entries with match the same number of items in the input. The result of this stage is an input sentence annotated with a subset of the codes and respective possible translations.

The input sentence is passed to a comparer (S7) which compares it with the source sides of the examples in the annotated bilingual repository (S4). Only a small subset of the examples need be considered for comparison by means of a standard information retrieval phase which retrieves examples from the repository only if they share some number of words with the input. The comparer passes the input and the example it is being compared against to the Unmatched Source Parts Detector (S8) which determines a series of interleaved matched and unmatched stretches. The matched stretches comprise those words which are identical in the input and source side of the example; furthermore, the thesaurus codes and translations with which each is labelled must have a non-null intersection.

For instance, suppose that an English-Japanese bilingual repository includes the fragment . . . learning how to play the piano ⇔ piano wo hiku koto wo benkyou site . . . .

The bitext annotator annotates the English wordplay with its Japanese translation in this context, hiku (literally, to pluck). Now consider an input including the fragment:

. . . learning how to play the flute

Superficially the source side of the bilingual fragment appears a good match, differing only in the single words flute and piano. However, the source language annotator locates the dictionary entry needed to translate play the flute, which requires a different verb in Japanese, fuku (literally to blow). Since the two instances of play in English are labelled with different translations, they must be assigned to an unmatched stretch, not a matched stretch, and the overall goodness of this match must be adjusted accordingly.

The unmatched stretches are those which differ between input and SSE. A relation (called correspondence) is established between items in the unmatched stretches. For instance if the unmatched stretches consist of a single word on each side, these words are put in correspondence; if the unmatched stretches consist of a single constituent, then there is a unique item within each, called the head, which is syntactically determined, and the heads are also put into correspondence. For two items in correspondence, the cross-product of the thesaurus codes associated with the two items is submitted to the similarity computation. The similarity value of the most similar pair or pairs is passed back to the comparer (S7) for use in the global computation of similarity. The comparer determines the most similar example (MSE) based on the lengths of matched and unmatched stretches and the similarity of the thesaurus codes of corresponding items in the unmatched stretches.

In addition the possible translations of the words in the unmatched input stretch are restricted to those associated with the code or codes having the greatest similarity.

For example suppose a Japanese-English bilingual repository contains the text:

reizouko ni suzuki wo hozon site kudasai ⇔ please put some sea bass in the refrigerator The Japanese word suzuki is ambiguous between a name denoting a human (with a thesaurus code 1220) and a type of fish, with the thesaurus codes 1430 (food) and 1564 (animal). The bitext annotator aligns suzuki with the English sea bass, eliminating the human reading. Now suppose the input is the Japanese sentence reizouko ni tumami wo hozon site kudasai The Japanese word tumami is ambiguous between the English snack with the thesaurus codes 1430 (food) and the English knob, with thesaurus code 14543, a type of handle. The codes having the maximum similarity in the unmatched stretches are 1430 on both sides. In this way, it is determined that the translation of the input word tumami should be snack(s) rather than knob(s).

The output of the Comparer and Unmatched Source Parts Detector are then passed to two further modules. The Aligned Example Target Parts Determiner (S9) determines which of the word positions in the target side of the MSE are aligned with the words in the unmatched stretch in the source side of the MSE. The Unmatched Input Source Parts Translator (S10) then combines the remaining translations associated with the unmatched input source parts according to some grammar or model of the target language. The substitutor (S11) replaces the words in the positions in the target side of MSE determined by the Aligned Example Target Parts Determiner with the translations computed by the Unmatched Input Source Parts Translator.

Figure 2:
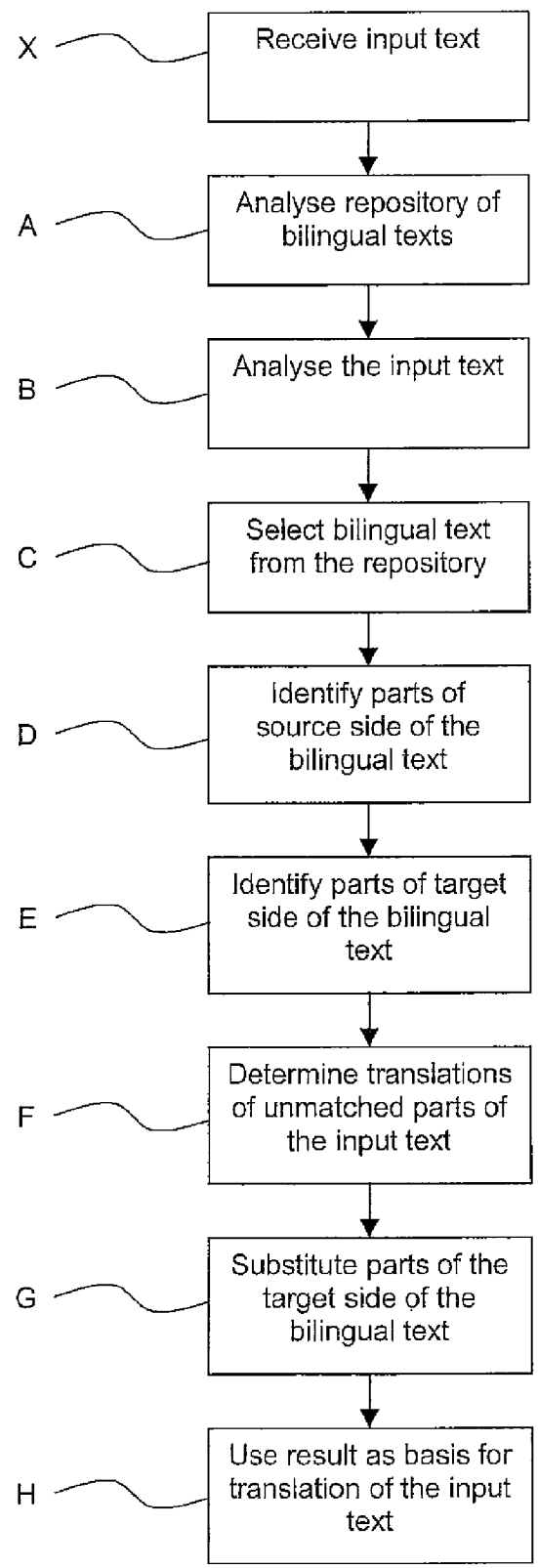
FIG. 2 is a flowchart showing the steps performed by the translation apparatus in this embodiment.

FIG. 2 is a flowchart summarising the steps performed in a method embodying the present invention. In step X of the method, an input text is received in a source language, to be machine translated to an output text in a target language using a repository comprising a plurality of bilingual texts, each bilingual text comprising a text in the source language paired with its translation in the target language.

In step A, the repository of bilingual texts is analysed using a bilingual resource to associate information from the bilingual resource with the respective source language sides of at least some of the bilingual texts in the repository. Or, a repository of bilingual texts is used that has been pre-analysed in such a way.

In step B, the input text is analysed using a bilingual resource to associate information from the bilingual resource with the input text.

In step C, a bilingual text is selected from the repository to be used as a basis for determining the translation of the input text.

In step D, parts of the source side of the bilingual text selected in step C are identified that differ from corresponding respective parts of the input text using the information associated with the input text and the information associated with the source side of the bilingual text selected in step C, those parts being designated unmatched parts.

In step E, those parts of the target side of the bilingual text selected in step C are identified that are respective translations of the unmatched parts of the source side of that bilingual text.

In step F, respective translations of the unmatched parts of the input text are determined.

In step G, the parts of the target side of the bilingual text identified in step E are substituted with the translations determined in step F.

In step H, the result of step C is used as the translation of the input text, or at least as a basis therefor.

It will be appreciated that steps A to C are useful in their own right; for example one apparatus could perform steps A to C, while another apparatus could perform steps D to H described below using the result of steps A to C. In this case, in step C it is understood that the selection is performed in dependence upon the information associated with the input text and the information associated with the source sides of the respective bilingual texts.

FIG. 3 outlines an algorithm for the translation algorithm. The algorithm shown in FIG. 3 is presented in pseudo code. The procedure takes as parameters an input text, a bilingual repository, and a bilingual resource.

The first two steps annotate the input text and bilingual repository with the requisite bilingual data. The procedure for annotating the input text determines the most appropriate annotation when there is an ambiguity. This is less necessary for the annotate used with the repository because the translations are already determined. The best annotation may use the kind of prioritised tiling described in [U.S. Pat. No. 5,978, 798, Apparatus for and Method of Accessing a Database].

The next section finds the most similar example text to the input text. In the algorithm, the entire repository is searched. In practise, the most likely candidates may first be pre-fetched using techniques common in the literature of information retrieval [Information Retrieval, Van Rijsbergen, Butterworths, 1979], possibly using n-gram techniques and semantic proximity. The score may also be computed by including information from the unmatched_parts described hereinafter. The similarity computation may make use of dynamic programming procedures common in the approximate string matching and bioinformatics fields.

We next extract or compute those parts of the input text that did not match the example and the example_target_parts that need to be replaced because they did not match. We use inner_translate to determine what the example_target_parts should be replaced with, by translating the unmatched_input_ part. We may use extra knowledge from the example itself to help determine the translation, such as other words that have been correctly translated but help to determine the correct sense. We may also use the example_target_parts to help determine the appropriate selection and rendering of translated words. The bilingual resource has been included as a parameter, but it is possible that all the necessary information has already been included during annotation of the example and input text.

We next build an output text from the example by substituting new translated_source_parts for the previous example target parts. It should be emphasised that there may be a plurality of stretches in the example target parts that are being replaced with a plurality of stretches in the translated source parts. In practise, if the annotation of the source text by the bilingual resource has been fully disambiguated, this final translation stage may simply be a matter of extracting that annotation.

We may also want to make further cosmetic improvements to the output text after substitution, such as ensuring words in the boundaries of the translated source parts agree with the remainder of the example. We may also wish to change the textual formatting to agree, for example to agree with the formatting of the input text. Such changes are made by the improve function. The result of this, a translation of the input_ text, is returned.

It will be appreciated that operation of one or more of the above- or below-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

In more detail, each of block of the translation apparatus may be constituted by hardware logic, or may be constituted by software with use of a Central Processing Unit (CPU) as described below.

That is, the translation apparatus has: (i) the CPU (central processing unit) for executing an instruction of a control program realizing various functions; (ii) a ROM (read only memory) storing the program; (iii) a RAM (random access memory) for expanding the program; (iv) a storage device (storage medium) such as a memory storing the program and various data; and (v) the like. The object of the present invention also can be achieved by (i) providing, for the translation apparatus, a storage medium storing, in a computer readable manner, a program code (executable program; intermediate code; source program) of the control program for the present system, and (ii) causing a computer (CPU or MPU) to read and execute the program code stored in the storage medium, the program code being the software realizing the aforementioned functions.

Examples of the storage medium are: (i) tapes such as a magnetic tape and a cassette tape; (ii) magnetic disks such as a Floppy® disk and a hard disk; (iii) optical disks such as a compact disk read only memory (CD-ROM), a magnetic optical disk (MO), a mini disk (MD), a digital video disk (DVD), and a CD-Rewritable (CD-R); (iv) cards such as an IC card (inclusive of a memory card) and an optical card; and (v) semiconductor memories such as a mask ROM, an EPROM (electrically programmable read only memory), an EEPROM (electrically erasable programmable read only memory), and a flash ROM.

Further, the translation apparatus may be connectable to a communication network, and the program code may be supplied via the communication network. The communication network is not particularly limited. Specific examples thereof are: the Internet, Intranet, Extranet, LAN (local area network), ISDN (integrated services digital network), VAN (value added network), CATV (cable TV) communication network, virtual private network, telephone network, mobile communication network, satellite communication network, and the like. Further, the transmission medium constituting the communication network is not particularly limited. Specific examples thereof are: (i) a wired channel using an IEEE 1394, a USB (universal serial bus), a power-line communication, a cable TV line, a telephone line, an ADSL line, or the like; or (ii) a wireless communication using IrDA, infrared rays used for a remote controller, Bluetooth®, IEEE 802.11, HDR (High Data Rate), a mobile phone network, a satellite connection, a terrestrial digital network, or the like. Note that, the present invention can be realized by (i) a carrier wave realized by electronic transmission of the program code, or (ii) a form of a series of data signals.

The following Appendix is presented in the form of a paper, and provides an alternative description of an embodiment of the present invention.

APPENDIX

Example-Based Translation System

Abstract

In this paper, we describe a hybrid approach to Machine Translation that exploits a corpus of example translations augmented with resources and techniques from rule-based MT. Our main motivation is to achieve reasonable accuracy for some subdomains with good time and space characteristics. Our architecture is relatively deterministic and therefore quite modest in its consumption of computational resources. At the same time, algorithms inspired by a view of translation in terms of string edits allow us to exploit some of the information available in the corpus to improve accuracy in a way that would be more difficult in other models. We describe the system, illustrate how it exploits syntactic and semantic analysis for improved matching and disambiguation, and analyse our competition results.

1. Introduction

This paper describes a Japanese English translation system for basic travel conversation. We have pursued research and development in MT for more than 20 years, though almost exclusively in the English to Japanese direction. Aiming for maximally usable results rather than theoretical purity, we have made extensive use of resources that we have accumulated over this period. Nevertheless, our approach does offer some novel perspectives on the field that we think may be of wider interest. These include the interplay of thesaurus and dictionary information in example matching and ambiguity resolution, exploiting the potential of explicit examples.

Our recent work has focused on a relatively lightweight MT system suitable for embedding in a PDA-like device for bi-directional English-Japanese conversation. In this formulaic domain, we view existing translation examples as an invaluable source of large, discontinuous, colloquial and often idiosyncratic patterns. Our approach takes as its starting point the work of Nagao (1984), which was loosely[1] characterised as 'translation by analogy', and continues along the lines pursued by Sumita (2003). We think of this line of research as 'edit-based translation'. We determine a source edit transcript (a set of substitutions, insertions and deletions) which transforms the source side of an example in the example base into the input string (the query). We then translate the inputs and outputs of this edit transcript to give a similar transcript for the target language, and apply this target edit transcript to the target side of the example.

[1]. As opposed to the pure analogical translation approach of Lepage and Denouval (1995)

The translation of the source items in the edit transcript's input is merely those target language items (words plus positions) with which they are aligned in the example (as determined off-line). The translation of the edit transcript's output is based on a bilingual dictionary and lightweight dependency parse. We analyse the entire query using these resources in a typical rule-based manner, but using the best matching example to assist in disambiguation. We then extract the sub-parts that represent the target edit transcript's output.

We choose the single most similar example as determined by a function of edit distance enriched with semantic similarity. This approach contrasts with combinatorially more extravagant approaches such as those found in SMT (Brown et al, 1990), and EBMT (Brown, 1996) where the translation is assembled from fragments.

Figure 4:
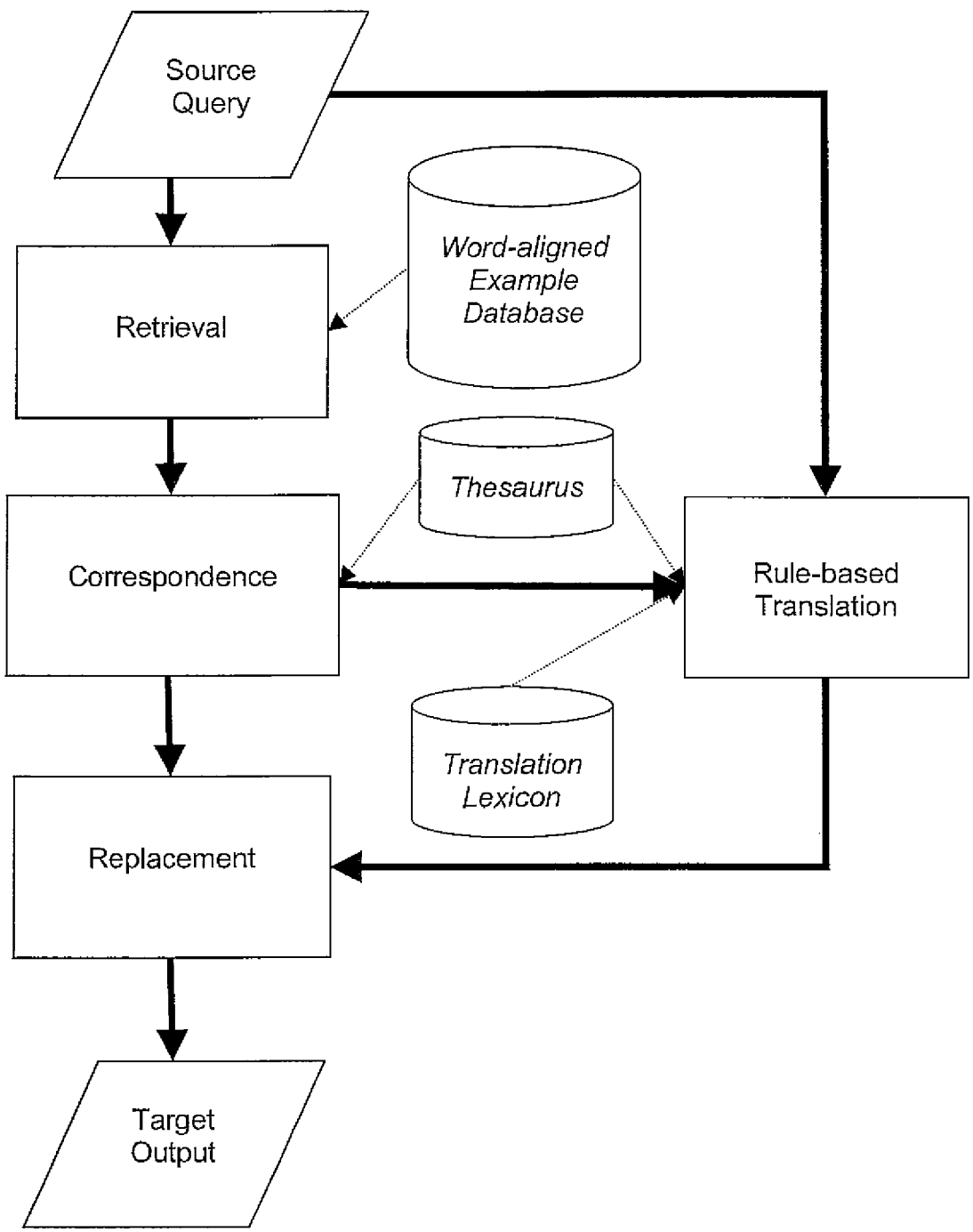
FIG. 4 is a schematic diagram illustrating the module structure of a translation apparatus embodying the present invention.

FIG. 4 shows the major module structure of our system.

The system takes as input a string in the source language, which we call the query, and retrieves a set of candidate examples from the example base. The next stage, correspondence, computes the source edit transcript for the query and each of the candidate examples, and uses this to rank the examples by similarity (Section 2). The query is also analysed by the rule-based translation system, and the best matching example may be used to help resolve ambiguities at this stage (Section 3). The target side of the best matching example (the basis) and the translation of the query are passed to the replacement phase which computes the exact scope of the target edit transcript and applies it to the basis (Section 4).

In the remainder of this paper, we provide a more detailed description of each of the modules, and conclude with a description and discussion of our competition results.

2. Correspondence

The source edit transcript is determined in a stage we call correspondence, which performs an ordered alignment of two strings in the source language. Candidate strings for correspondence with the query are retrieved from the example base using standard vector-space retrieval techniques (Rijsbergen, 1979). Correspondence computes an sequence of alternating matched and unmatched stretches and determines the score based on the lengths of these. Each unmatched stretch comprises the example side (UXS), which is the input of the source edit, and the query side (UQS), which is the output of the source edit. An edit transcript is thus a set of operations of the form UXS=>UQS. An empty UXS represents an insertion, an empty UQS a deletion.

As typical of EBMT systems, the score also includes a component for semantic similarity based on a tree-structured thesaurus. A word may be associated with one or more semantic codes; the more similar the codes of two words, the less the cost of substituting one for the other.

For example, given the input:

この 階 に 喫茶店 が あり ます か。 this floor NI coffee shop GA be POL Q (1)

and the two stored examples

この階にレストランがありますか。

Is there a restaurant on this floor? (2)

この階に子供服がありますか。

Is this the floor for children's clothes? (3)

the first of these will be preferred due to the semantic proximity of 喫茶店 (coffee shop) and レストラン (restaurant), giving the result Is there a coffee shop on this floor? On the other hand, given an input such as:

この階にコートがありますか。 (4)

which differs from the previous input by a single word コート (coat or court), we will prefer the second, giving the output Is this the floor for coats? (We'll see below how the translation coat gets chosen and inflected.)

3. Rule-Based Translation

We have explored various ways to implement the translation of the unmatched query stretches. For instance, a version of the system which appears as part of Sharp's Power EJ Translation Package uses the aligned example base itself. However, this strategy requires a much larger example base, and in the competition version of the system, the translation is based on a separate bilingual dictionary. The dictionary we use is collected from a variety of sources, most of which are ultimately hand-coded, though we can exploit translation frequencies derived automatically by application of the dictionary to the alignment of our example base.

We use a lightweight dependency parser to analyse the input; the dictionary entries may refer to any combination of dependency structure and linear order of items. Bilingual dictionary entries are also labelled with thesaurus codes.

We determine all dictionary entries that could apply to any part of the query. The reason why we don't restrict ourselves to consideration of the unmatched stretches (US) only is that a single dictionary entry may be used to translate material that straddles the matched/unmatched boundary. Since we key dictionary entries by the single least frequent item, and since an entry may contain a variable, the key of an entry that uses material within the US may lie outside the US. In effect we need to expand the US to include anything that is cotranslated with it. For instance, given the input and example:

彼 は3 時 に 戻り ます。

He TOP 3 o'clock NI return POL (5)

彼 は 月曜日 に 戻ります。

He'll be back on Monday (6)

We need to recognise that the input will use the dictionary entry:

+clocktime に ⇔at_PREP+clocktime (7)

and expand the unmatched stretches to include the particle に, thereby getting the correct translation (8) rather than (9):

He'll be back at 3 o'clock. (8)

He'll be back on 3 o'clock. (9)

We thus compute a subset of the lexical entries according to a prioritised tiling scheme as used in Poznanski et al. (1998). Entries covering more source language items take precedence. Translation frequency can be used as a tie breaker. Unlike the case of trying to determine the correct lexical entry in isolation, the existence of a matching example can assist in the event of semantic ambiguity. For instance, in (4) above, we can prefer the translation coat for the ambiguous コート because our thesaurus tells us that a coat is more like children's clothes than a (tennis) court is (and also, bearing in mind the two similar examples (2) and (3), a coat is more like children's clothes than a (tennis) court is like a restaurant).

To complete the operation of the translation module, we could combine the target sides of the prioritised lexical entries, mirroring the dependency structure of the source, then linearise the target structure and extract the translation of the unmatched stretches. In fact, as the susbsequent phase may adjust the exact scope of the unmatched stretches, we defer even the combination of lexical entries until after this phase.

4. Replacement

In this phase, we apply the target language edit transcript that we have computed, replacing the target items aligned with the UXS by the translations of the UQS. Our example base is word-for-word aligned off-line using our dictionaries. Incidentally, this allows us to largely determine the senses of ambiguous words used in the examples. The alignment is typically not total—if the unmatched stretch is not aligned, we can fail the plan based oil this example and use the next highest scoring example.

This module also makes use of the lightweight dependency parse, allowing us to determine the head or heads within any stretch of words (in either language)—the internal head, and what that stretch is attached to in the remainder of the sentence—the external head.

Deletions from the example are the easiest edits to deal with. The alignment of the deleted material is deleted from the target side of the example (the basis). If the deletion is of the head of a noun phase, then the associated grammatical elements such as preceding determiners and prepositions are also deleted.

Substitutions may be more complex. For each UXS, we find in the basis the image under alignment of all items in the UXS. These may be discontinuous in the basis, but if they are separated by common words only, the stretches are merged. If multiple stretches remain, we ascertain the head of each, compute the inverse alignment to the heads of the UXS in the source side, and try to find the corresponding items in the input (or query) unmatched stretch (UQS).

For instance when the sentence:

[明日 フットボール] の 試合 が 当地 tomorrow football NO game GA here

で あり ます か。

DE be POL Q (10)

matches the example:

[今夜, 野球₂]の試合が当地でありますか。

Will there be a baseball₂ game here tonight₁? (11)

the unmatched example stretch (indicated within [])aligns to discontinuous stretches in the target (as shown by co-subscripting). Using semantic proximity we can detect the (sub-) correspondence between 明日(tomorrow) and 今夜(tonight), and position the translations correctly, giving:

Will there be a football game here tomorrow? (12)

If no semantically similar elements are discovered, we can use syntactic similarity as a fallback strategy for stretch splitting.

Finally, insertions in the edit are most problematic. This is because we don't know where to position the translation of the UQS. We treat insertions in two different ways, depending on whether the inserted material is adverbial (renyou) or adnominal (rentai). Adverbial insertions are again divided into two cases. Interjections, topics and similar are positioned at the start of the basis, other adverbials at the end. In the case of adnominal insertions, their external head is pulled into the US, turning the insertion into a substitution and giving us a position for the translated material.

In fact, the strategy of pulling the external head into a US is used to solve another problem. Japanese is uniformly head-final, while English noun phrases have mixed headedness (an open door, but a door open to all). Substitution of adnominals can lead to problems such as the following:

次の 電車 は この ホーム で 合って いますか。 next train TOP this platform DE be right (13)

ロンドン行きの電車はこのホーム合っていますか。

Is this the right platform for the train to London? (14)

Given the input (13) and stored example (14), we obtain the translation (15)

*Is this the right platform for the train next? (15)

Pulling the head noun into the US means we retranslate it together with its modifier and allows the resulting translation to be ordered correctly by the rules of English. Even if the head is ambiguous, retranslation should not be a problem as this word will have the same semantic code in query and example source which will lead us to choose the same translation.

Having now determined the exact scope of each edit operation, we compute the target string to be inserted/substituted in the basis. The target sides of the lexical entries which apply to any item in the (possibly expanded) UQS are combined by mirroring the dependency structure of the source, then linearised according to an English generation grammar. As they are put into position in the target side of the example, various steps are taken to 'paper over the cracks'[2]. These include treatment of the a/an alternation, removal of multiple prepositions, determiners before pronouns and so on, generation of inflected comparatives and superlatives, etc.

2. The 'boundary friction' of Nirenburg et al. (1993)

One particularly interesting aspect of this final rendering phase is the copying of features from what is being replaced to what is replacing it. So for instance if the stretch being replaced is headed by a noun, but the replacement has been translated with a verb as head, we nominalise the verb using monolingual information about English. For instance, given the input (16) and example pair (17):

この　電車　は定刻に　　出発の　予定　です　か。 this train TOP on-time departure NO plan be Q    (16)

この便は定刻に到着の予定ですか。

Will this flight arrive on time    (17)

we obtain a plan for the translation that can be represented as:

Will this t(電車)(出発) on time?    (18)

出発 (departure) is unambiguously a noun in the Japanese sentence (it's followed by the post-nominal particle の). We recognise that this translation is being substituted for a verb in the basis and obtain the verbal equivalent for departure from a monolingual dictionary, giving:

Will this train depart on time?    (19)

As well as major category changes, we can also copy syntactic features, which is how we achieve the translation coats in Is this the floor for coats? discussed above.

This can be contrasted with a standard SMT system where these part-of-speech alternations are built into the translation model and the target language model will settle on the correct one. But because such a translation model contains the cross-product of lexical and part-of-speech alternations, obviously its size and the time to search the space increases much faster than the number of monolingual rules required in our system.

5. Results

Our EBMT system can translate an input only if its example base contains an example which matches sufficiently closely. We use another system to translate when this is not the case. Although development is under way to use the EBMT system's own rule-based translation system, for the purpose of this paper we used a completely independent system, which we will call the Black Box System (BBS).

Table 1 shows the results for our system on various test sets in different configurations. We give the results for the BBS in the first column, then three columns for each of two example base configuration: our own example base (Sharp Laboratories of Europe or SLE) of 11,913 examples (175,000 Japanese characters, 380,000 words of English, of similar content to the training set provided for the purpose of this paper, which is a competition relating to the IWSLT 2006 Evaluation campaign); and this example base combined with the competition training set, giving a total of 56,531 examples (1.7 m Japanese characters, 1.93 m words of English). The column headed 'EBMT Only' gives the scores for the subset of the input that the EBMT system attempted to translate, a percentage of the total input given in the next column. The final column gives the results using the BBS to translate those sentences for which our system failed to find a similar enough example.

The results fall into two classes with regard to quality, with the results on devset2 (IWSLT 2004) and devset3 (IWSLT 2005) massively better than those for devset4 and the test set (IWSLT 2006). This difference may be due partly to the number of reference translations (16 vs. 7), and partly due to overall difficulty. The latter results are intermediate amongst the participants, but the results for eg devset3 are better than any of those achieved in the actual 2005 competition (Eck and Hori 2005). We attribute such results to two factors not found in state-of-the-art SMT (in 2005). The first is the use of examples, which effectively act as large discontinuous elements in a translation model. However, recent work in SMT has started to address this issue directly, eg Chiang, (2005). The second is the potential for the target language stretches which will be replaced to influence the translation which will replace them, a causal interaction with no counterpart in SMT.

TABLE 1

BLEU [NIST] scores for Rule-Based System (RBS) and EBMT with two example base configurations

|  | | SLE Example Base | | | SLE + IWSLT Example Base | | |
| --- | --- | --- | --- | --- | --- | --- | --- |
|  | BBS | EBMT Only | % age | +BBS | EBMT Only | % age | +BBS |
| devset2 | .3524 | .4910 | 70.5 | .4063 | .5610 | 75.3 | .4663 |
| (IWSLT2004) | [7.7607] | [7.6240] |  | [8.2176] | [8.927] |  | [8.8784] |
| devset3 | .3137 | .4994 | 66.0 | .3930 | .5450 | 72.7 | .4411 |
| (IWSLT2005) | [7.5425] | [7.8347] |  | [8.1415] | [8.1934] |  | [8.5965] |
| devset4 | .1917 | .1537 | 38.7 | .1828 | .1313 | 74.2 | .1835 |
| (IWSLT2006) | [5.5127] | [2.1997] |  | [5.5208] | [1.4768] |  | [5.6189] |
| test |  |  |  |  |  | 59.4 | .1599 |
| (asr 1best) |  |  |  |  |  |  | [5.3393] |
| test (correct) | .1797 |  |  |  |  | 60.6 | .1726 |
|  | [5.4599] |  |  |  |  |  | [5.6497] |

Our system configuration is suitable for lower powered machinery with smaller memory. The total data size is under 10 Mb for the small example base, under 17 Mb for the larger one, including lexicon of 100,000 entries. Translation speed is around 1 second per sentence on a 500 MHz processor with 128 Mb RAM.

6. References

Brown, P. F., Cocke, J., Della Pietra, S. A., Della Pietra, V. J., Jelinek, F., Lafferty, J. D., Mercer, R. L., Roossin, P. S. A statistical approach to machine translation. Computational Linguistics Volume 16, Issue 2 (June 1990) MIT Press Cambridge, Mass., USA, pp. 79-85, 1990.

Brown, R. D. "Example-Based Machine Translation in the Pangloss System", Proceedings of the 16th Coling, Copenhagen, 1996.

Chiang, D. "A hierarchical phrase-based model for statistical Machine Translation" Proceedings of the 43rd Annual Meeting of the ACL, 2005.

Eck, M. and C. Hori "Overview of the IWSLT 2005 Evaluation Campaign", Carnegie-Mellon University, Pittsburgh, 2005.

Lepage, Y and E. Denoual "The purest EBMT system ever built: no variables, no templates, no training, examples, just examples, only examples", in Proceedings of the 2nd Workshop on Example-Based Machine Translation, Phuket 2005.

Nagao, M "A Framework of a Mechanical Translation between Japanese and English by Analogy Principle." In A. Elithorn and R. Banerji (eds.) *Artificial and Human Intelligence*, Amsterdam: North Holland, pp. 173-180. 1980.

Nirenburg, S., C. Domashnev and D. J. Grannes "Two approaches to matching in example-based machine translation", in $5^{th}$, TMI, Kyoto, 1993.

Poznanski, V., P. Whitelock, J. Ijdens, S. Corley "Practical Glossing by Prioritised Tiling", Proceedings of the $17^{th}$ COLING, Montreal, 1998.

Rijsbergen, C. J. "Information Retrieval", London: Butterworths, 1979.

Sumita, E. "EBMT Using DP-Matching Between Word Sequences" in *Recent Advances in Example-based Machine Translation*. Carl, M. and Way, A. (eds). Kluwer Academic Publishers, Dordrecht, pp. 189-209, 2003.

The invention claimed is:

1. A method of machine translating, in a translation device, an input text in a source language to an output text in a target language using a repository comprising a plurality of bilingual texts each comprising a text in the source language paired with its translation in the target language, the method comprising:
   inputting the input text into the translation device;
   (a) analyzing the repository of bilingual texts using a bilingual resource to associate information from the bilingual resource with the respective source language sides of at least some of the bilingual texts in the repository, or at least using a repository of bilingual texts that has been pre-analyzed in such a way, the associated information including a dictionary entry for words in the bilingual texts and one or more thesaurus codes associated with the dictionary entry, a same thesaurus code being associated with one word of the source language and one word of the target language;
   (b) analyzing the input text using the bilingual resource to associate information from the bilingual resource with the input text, the associated information including one or more thesaurus codes associated with the input text;
   (c) selecting a bilingual text from the repository to be used as a basis for determining the translation of the input text;
   (d) identifying parts of the source side of the bilingual text selected in step (c) that differ from corresponding respective parts of the input text using the information associated with the input text and the information associated with the source side of the bilingual text selected in step (c), those parts being designated unmatched parts;
   (e) identifying those parts of the target side of the bilingual text selected in step (c) that are respective translations of the unmatched parts of the source side of that bilingual text;
   (f) determining respective translations of the unmatched parts of the input text;
   (g) substituting the parts of the target side of the bilingual text identified in step (e) with the translations determined in step (f);
   (h) using the result of step (g) as the translation of the input text, or at least as a basis therefore; and
   outputting the result of step (h) from the translation device as the output text.

2. A method as claimed in claim 1, wherein step (c) comprises selecting a bilingual text from the repository in dependence upon the information associated with the input text and the information associated with the source sides of the respective bilingual texts.

3. A method as claimed in claim 2, further comprising:
   (i) determining a score for at least some of the bilingual texts in the repository using the information associated with the input text and the information associated with the source sides of the respective bilingual texts,
   wherein step (c) comprises selecting a bilingual text from the repository in dependence upon the scores determined in step (i).

4. A method as claimed in claim 3, wherein step (i) comprises comparing the information associated with the input text with the information associated with the source sides of the respective bilingual texts.

5. A method as claimed in claim 3, wherein scores in step (i) are determined for each of the bilingual texts in the repository for which there is associated information.

6. A method as claimed in claim 3, wherein step (c) comprises selecting the bilingual text having the highest score determined in step (i).

7. A method as claimed in claim 1, wherein step (c) comprises selecting a bilingual text from the repository in dependence upon the results of step (d).

8. A method as claimed in claim 7, further comprising:
   (i) determining a score for at least some of the bilingual texts in the repository using the information associated with the input text and the information associated with the source sides of the respective bilingual texts,
   wherein step (c) comprises selecting a bilingual text from the repository in dependence upon the scores determined in step (i); and determining at least some of the scores in step (i) in dependence upon the results of step (d).

9. A method as claimed in claim 1, wherein step (f) is performed using information relating to the bilingual text selected in step (c).

10. A method as claimed in claim 1, wherein step (f) is performed using information relating to matched parts of the bilingual text selected in step (c) to provide a context in which to translate the unmatched input parts.

11. A method as claimed in claim 1, wherein step (f) is performed using information relating to the unmatched target parts of the bilingual text selected in step (c) to influence the translation of the unmatched input parts.

12. A method as claimed in claim 1, wherein step (f) is performed using information from the bilingual resource to effect the translation.

13. A method as claimed in claim 1, wherein the bilingual resource used in step (a) is the same as or similar to that used in step (b).

14. A method as claimed in claim 1, wherein the information associated with each of the at least some bilingual texts in step (a) is of the same type or of a similar nature to the information associated with the input text in step (b).

15. A method as claimed in claim 1, wherein the information associated with the source side of the bilingual texts comprises the translation of the words in that bilingual text and the information associated with the input text comprises one or more possible translations of the items in the input text.

16. A method as claimed in claim 1, wherein the information associated with the source side of the bilingual texts comprises one or more codes representing the possible senses of the words in that bilingual text and the information associated with the input text comprises one or more codes representing the possible senses of the words in that input text.

17. A method as claimed in claim 16, further comprising:
(i) determining a score for at least some of the bilingual texts in the repository using the information associated with the input text and the information associated with the source sides of the respective bilingual texts,
wherein step (c) comprises selecting a bilingual text from the repository in dependence upon the scores determined in step (i); and determining the score in step (i) so as to reflect the similarities of the most similar of the codes representing the senses of the words in the input text and the source side of the bilingual text.

18. A method as claimed in claim 16, wherein the translations in step (f) is determined to be those appropriate when the words have codes which are most similar to one or more codes associated with the words in the source side of the bilingual text selected in step (c).

19. A method as claimed in claim 16, wherein step (d) is performed on the basis that those parts of the source side of the bilingual text whose translation or one of whose codes is not one of the translations or codes associated with parts of the input text are considered to be different.

20. A method as claimed in claim 1, wherein each text comprises a plurality of data items and the source and target languages are source and target data formats for the data items, thereby providing a method of machine translating an input sequence of data items in a source format to an output sequence of data items in a target format using a store comprising a plurality of example sequences in the source format each paired with its translation in a second format.

21. A method performed in a device that selects a bilingual text for use as a basis for machine translating an input text in a source language to an output text in a target language using a repository comprising a plurality of bilingual texts each comprising a text in the source language paired with its translation in the target language, the method comprising:
inputting the input text into the device;
(a) analyzing the repository of bilingual texts using a bilingual resource to associate information from the bilingual resource with the respective source language sides of at least some of the bilingual texts in the repository, or at least using a repository of bilingual texts that has been pre-analyzed in such a way, the associated information including a dictionary entry for words in the bilingual texts and one or more thesaurus codes associated with the dictionary entry, a same thesaurus code being associated with one word of the source language and one word of the target language;
(b) analyzing the input text using the bilingual resource to associate information from the bilingual resource with the input text, the associated information including one or more thesaurus codes associated with the input text;
(c) selecting, in dependence upon the information associated with the input text and the information associated with the source sides of the respective bilingual texts, a bilingual text from the repository to be used as a basis for determining the translation of the input text; and
outputting the bilingual text selected in step (c) from the device.

22. An apparatus for translating an input text in a source language to an output text in a target language using a repository comprising a plurality of bilingual texts each comprising a text in the source language paired with its translation in the target language, the apparatus comprising:
(a) means for analyzing the repository of bilingual texts using a bilingual resource to associate information from the bilingual resource with the respective source language sides of at least some of the bilingual texts in the repository, or at least using a repository of bilingual texts that has been pre-analyzed in such a way, the associated information including a dictionary entry for words in the bilingual texts and one or more thesaurus codes associated with the dictionary entry, a same thesaurus code being associated with one word of the source language and one word of the target language;
(b) means for analyzing the input text using the bilingual resource to associate information from the bilingual resource with the input text, the associated information including one or more thesaurus codes associated with the input text;
(c) means for selecting a bilingual text from the repository to be used as a basis for determining the translation of the input text;
(d) means for identifying parts of the source side of the bilingual text selected by means (c) that differ from corresponding respective parts of the input text using the information associated with the input text and the information associated with the source side of the bilingual text selected by means (c), those parts being designated unmatched parts;
(e) means for identifying those parts of the target side of the bilingual text selected by means (c) that are respective translations of the unmatched parts of the source side of that bilingual text;
(f) means for determining respective translations of the unmatched parts of the input text;
(g) means for substituting the parts of the target side of the bilingual text identified by means (e) with the translations determined by means (f); and
(h) means for using the result of means (g) as the translation of the input text, or at least as a basis therefore.

23. An apparatus for selecting a bilingual text for use as a basis for machine translating an input text in a source language to an output text in a target language using a repository comprising a plurality of bilingual texts each comprising a text in the source language paired with its translation in the target language, the apparatus comprising:
(a) means for analyzing the repository of bilingual texts using a bilingual resource to associate information from the bilingual resource with the respective source language sides of at least some of the bilingual texts in the repository, or at least using a repository of bilingual texts that has been pre-analyzed in such a way, the associated information including a dictionary entry for words in the bilingual texts and one or more thesaurus codes associated with the dictionary entry, a same thesaurus code being associated with one word of the source language and one word of the target language;

(b) means for analyzing the input text using the bilingual resource to associate information from the bilingual resource with the input text, the associated information including one or more thesaurus codes associated with the input text;

(c) means for selecting, in dependence upon the information associated with the input text and the information associated with the source sides of the respective bilingual texts, a bilingual text from the repository to be used as a basis for determining the translation of the input text.

24. A program recorded on a computer readable non-transitory medium for controlling an apparatus to perform the method as claimed in claim 1 or 21.

\* \* \* \* \*